United States Patent
Liu

(10) Patent No.: US 9,371,218 B2
(45) Date of Patent: Jun. 21, 2016

(54) MOLDABLE FUNNEL

(71) Applicant: COSDA MANUFACTURING COMPANY, Taichung (TW)

(72) Inventor: Lai-Cheng Liu, Taichung (TW)

(73) Assignee: COSDA MANUFACTURING COMPANY, Taichung (TW)

(*) Notice: Subject to any disclaimer, the term of this patent is extended or adjusted under 35 U.S.C. 154(b) by 0 days.

(21) Appl. No.: 14/794,137

(22) Filed: Jul. 8, 2015

(65) Prior Publication Data

US 2015/0307340 A1 Oct. 29, 2015

Related U.S. Application Data

(63) Continuation-in-part of application No. 13/549,497, filed on Jul. 15, 2012, now abandoned.

(51) Int. Cl.
*B67C 11/02* (2006.01)
*B32B 15/20* (2006.01)
*B32B 1/08* (2006.01)
*B32B 3/04* (2006.01)
*B32B 3/26* (2006.01)

(52) U.S. Cl.
CPC . *B67C 11/02* (2013.01); *B32B 1/08* (2013.01); *B32B 3/04* (2013.01); *B32B 3/266* (2013.01); *B32B 15/20* (2013.01); *B67C 2011/027* (2013.01)

(58) Field of Classification Search
CPC .............. B67C 11/02; B67C 2011/022; B67C 2011/025; B67C 2011/027; B32B 15/20; B32B 1/08; B32B 3/04; B32B 3/266
USPC ................... 141/98; 428/35.7–35.9, 36.8, 98; 250/515.1, 517.1, 519.1
See application file for complete search history.

(56) References Cited

U.S. PATENT DOCUMENTS

| 4,190,131 | A | 2/1980 | Robinson | |
|---|---|---|---|---|
| 5,121,779 | A * | 6/1992 | Green | B67C 11/02 141/331 |
| 5,803,140 | A * | 9/1998 | Jodoin | B67C 11/02 141/332 |
| 6,276,411 | B1 * | 8/2001 | Veneziano | B67C 11/02 141/337 |
| 7,219,705 | B2 | 5/2007 | Wallek | |
| 7,851,038 | B2 | 12/2010 | Lohmeier | |
| 8,439,318 | B2 | 5/2013 | Blessman | |
| 8,757,698 | B1 * | 6/2014 | Rowland | B60N 3/044 296/97.23 |

(Continued)

FOREIGN PATENT DOCUMENTS

WO WO2010/099130 2/2010

*Primary Examiner* — Mark A Laurenzi
*Assistant Examiner* — Andrew Stclair
(74) *Attorney, Agent, or Firm* — Muncy, Geissler, Olds & Lowe, P.C.

(57) ABSTRACT

A moldable funnel is provided. A plurality of through holes are evenly arranged in a hand-moldable sheet, and at least parts of the through holes are unopened at a perimeter edge of the hand-moldable sheet. The hand-moldable sheet has shape-retention characteristics to retain the moldable funnel in a specific shape into which it is molded. Two covering layers at least cover two corresponding surfaces of the hand-moldable sheet respectively and are connected to each other via at least parts of the through holes. Whereby, the moldable funnel can be molded in a specific shape suitable for a specific space, so as to provide advantageous effects of adding liquid easily, conveniently, safely and rapidly, and the moldable funnel is light in weight, convenient for storage and space-saving.

15 Claims, 10 Drawing Sheets

(56) References Cited

U.S. PATENT DOCUMENTS

| | | | | |
|---|---|---|---|---|
| 2003/0041367 A1* | 3/2003 | Hadden | .................. | A41D 31/00 2/195.5 |
| 2004/0013849 A1* | 1/2004 | Kobayashi | ............ | A47L 23/266 428/95 |
| 2004/0123376 A1 | 7/2004 | Wang | | |
| 2007/0036937 A1* | 2/2007 | Lohmeier | ............... | B32B 15/08 428/98 |
| 2011/0059293 A1* | 3/2011 | Powell | .................. | B29C 69/025 428/138 |
| 2011/0135876 A1* | 6/2011 | Lohmeier | ............... | B32B 15/08 428/138 |
| 2011/0253571 A1* | 10/2011 | Rothbaum | ............. | B65D 63/10 206/320 |
| 2014/0014232 A1* | 1/2014 | Liu | ........................ | B67C 11/02 141/391 |

* cited by examiner

MOLDABLE FUNNEL

FIELD OF THE INVENTION

The present invention is a CIP of application Ser. No. 13/549.497, filed Jul. 15, 2012, the entire contents of which are hereby incorporated by reference.

BACKGROUND OF THE INVENTION

Description of the Prior Art

For operations of many machines, lubrication or maintenance is necessarily required. Various functional liquids such as engine oil or transmission liquid has to be removed and added regularly for requirements of lubrication or maintenance, so as to assure the safety of driving, maintain parts of a machine to function regularly and increase lifetime of the machine. However, the liquid-adding task is usually carried out in a narrow or crooked space, so it is very inconvenient. Besides, since the narrow or crooked space is usually constructed of a plurality of parts that are hard and sharp, it can possibly cause damage to a hand of user. For facilitating the liquid-adding task and avoiding the escape of the liquid, a kind of moldable funnel is developed accordingly.

As shown in FIG. 1, a pliable surface construction 10 like the above-mentioned conventional liquid-adding tool is disclosed in U.S. Pat. No. 7,851,038. In U.S. Pat. No. 7,851,038, the pliable surface construction 10 comprises a pliable hand-moldable sheet 12 made of lead and two pliable covering layers 14, 16. The pliable covering layers 14, 16 are adhered to and completely encompass the oppositely facing surfaces of the pliable hand-moldable sheet 12. The two pliable covering layers 14, 16 are larger in size than the hand-moldable sheet 12 and extend beyond the perimeter edge 121 of the pliable hand-moldable sheet 12. The two pliable covering layers 14, 16 are adhered together beyond the perimeter edge 121 to form a lip 18 surrounding the perimeter edge 121 of the hand-moldable sheet 12. The pliable surface construction 10 comprises the thick lead-made hand-moldable sheet 12, so that it is heavy in weight and not eco-friendly, and the pliable surface construction 10 is uneven after it is flatted, thus affecting another liquid-adding task. Furthermore, the two pliable covering layers 14, 16 are disposed on the oppositely facing surfaces of the pliable hand-moldable sheet 12 via adhering and not connected together in the regions located correspondingly on the oppositely facing surfaces of the pliable hand-moldable sheet 12, such that the combination strength of the two pliable covering layers 14, 16 and the pliable hand-moldable sheet 12 is poor.

US2011/0135876 discloses a three part laminated construction. The entirety of the perimeter edge is covered by the covering layers. No part of the hand-moldable sheet is exposed to outside, and none of longer and shorter exposed sections of the hand-moldable sheet is provided at the tapered portion.

US2004/0123376 discloses that the two covering layers are fabrics, paper, foamed EVA sheet, foamed PE sheet, or PVC, silicone and plastics as PE or PP, but not rubber; the covering layers are entirely connected together beyond the perimeter edge of the hand-moldable sheet (as shown in FIGS. 2 and 6), or the hand-moldable sheet is exposed at an entire of the perimeter edge of the hand-moldable sheet (as shown in FIG. 7). As to apparatus with the perimeter edge entirely encompassed, there is an annular lid formed without any part of the hand-moldable sheet, so that the annular lid is of worse shape-retention characteristics and disadvantageous for precisely applied to a narrow space such as an inlet of a radiator. As to apparatus with the perimeter edge entirely exposed, it can do harm to the user easily since an exposed sharp part of the metal sheet is formed at a hand gripping portion.

U.S. Pat. No. 5,121,779 discloses that discloses a funnel having a bottom edge which is straight, and the bottom edge is entirely covered by the cover layers. Additionally, the cover layers do not have shape-retention characteristics to retain the moldable funnel in a specific shape into which it is molded. As a result, the funnel cannot be shaped into a very small size and cannot be well retained in a specific shape into which it is molded since the tip portion is provided without exposed perimeter sections.

The present invention is, therefore, arisen to obviate or at least mitigate the above mentioned disadvantages.

SUMMARY OF THE INVENTION

The main object of the present invention is to provide a moldable funnel which can be manually molded into and retained in a specific shape suitable for a specific space, so as to provide advantageous effects of adding liquid easily, conveniently, safely and rapidly.

To achieve the above and other objects, a moldable funnel of the present invention includes a hand-moldable sheet and two covering layers.

The hand-moldable sheet includes two corresponding surfaces and a plurality of through holes. The through holes are evenly arranged in the hand-moldable sheet, and at least parts of the through holes are unopened at a perimeter edge of the hand-moldable sheet. The hand-moldable sheet has shape-retention characteristics to retain the moldable funnel in a specific shape into which it is molded. The two covering layers at least cover the two corresponding surfaces of the hand-moldable sheet respectively and are connected to each other via at least parts of the through holes.

Whereby, since the hand-moldable sheet has shape-retention characteristics, the moldable funnel may be manually molded into and retained in a specific shape suitable for any specific, narrow or crooked space, so as to provide advantageous effects of adding liquid (such as oils, water or the like) easily, conveniently, safely and rapidly. Besides, the moldable funnel is also light-weight, easy to store and space-saving.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

As shown in FIGS. 2 to 7, a moldable funnel 200 of a first embodiment according to the present invention is provided. The moldable funnel 200 is adapted for applying to a space which is specific, narrow or crooked. The moldable funnel 200 is of a moldable construction and can be manually molded into and retained in a specific shape suitable for the specific, narrow or crooked space, so as to facilitate the task of adding liquids such as oils or water.

Figure 1:
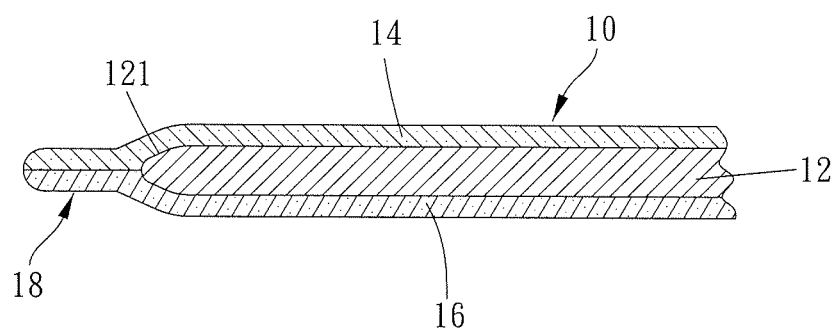
FIG. 1 is a drawing showing a pliable surface construction disclosed in U.S. Pat. No. 7,851,038.
Figure 2:
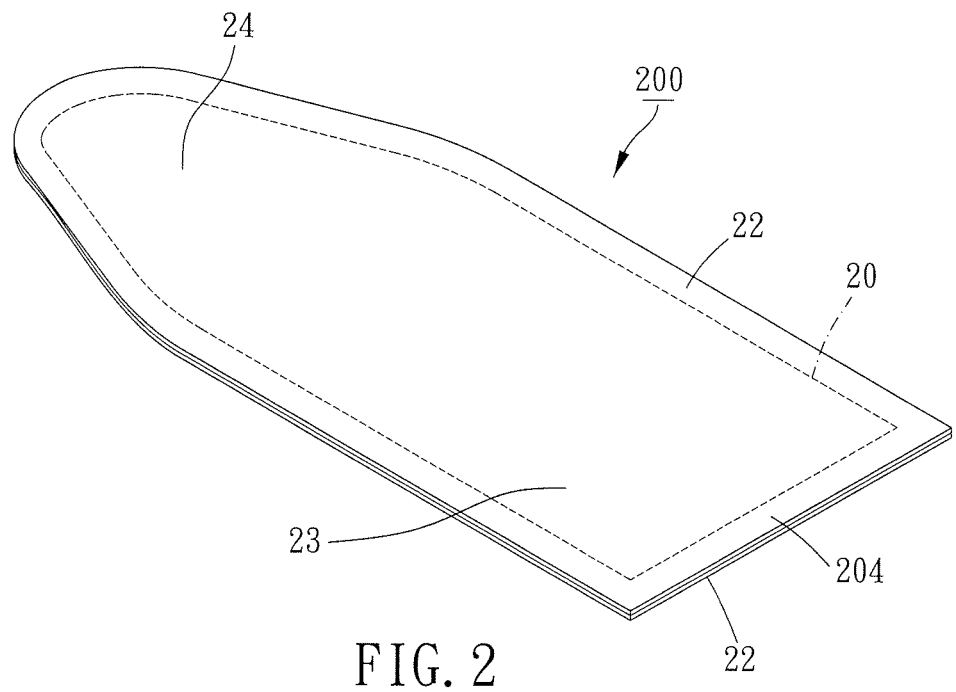
FIG. 2 is a perspective view of a moldable funnel according to a first embodiment of the present invention.
Figure 3:
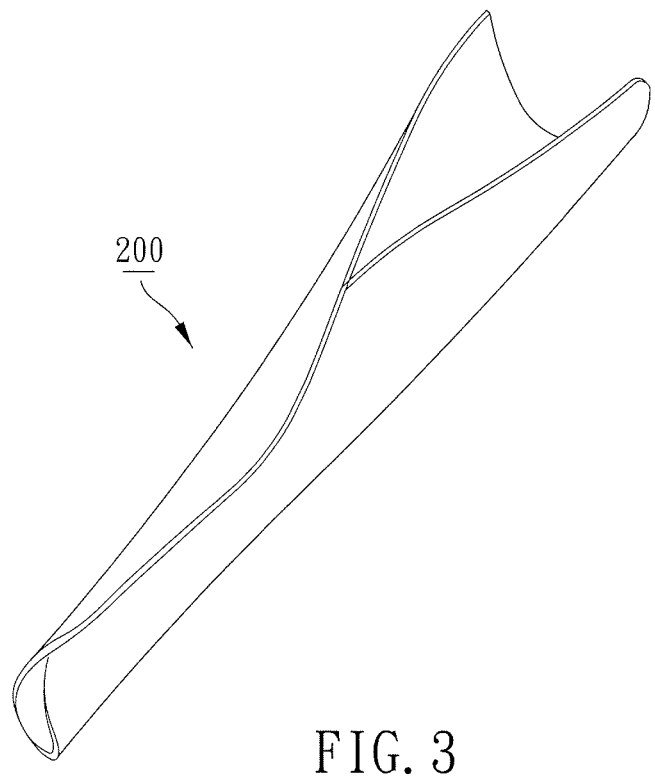
FIG. 3 is a drawing showing the moldable funnel in use according to the first embodiment of the present invention.

The moldable funnel 200 includes a hand-moldable sheet 20 and two covering layers 22. The moldable funnel 200 is substantially flat before it is molded (as shown in FIG. 2) and includes a first portion which is substantially rectangular and a second portion which integrally taperedly extends from the rectangular first portion, and the front end of the second portion is substantially arcuate. The moldable funnel 200 can be retained in the specific shape after molded (as shown in FIG. 3).

The hand-moldable sheet 20 includes two corresponding surfaces 201 and a plurality of through holes 202. The through holes 202 are evenly arranged in the hand-moldable sheet 20, and at least parts of the through holes 202 are unopened at a perimeter edge 203 of the hand-moldable sheet 20. More specifically, in this embodiment, the through holes 202 are evenly arranged in array in the hand-moldable sheet 20 along a direction which is perpendicular to the two corresponding surfaces 201 of the hand-moldable sheet 20, and all of the through holes 202 are unopened at the perimeter edge 203 of the hand-moldable sheet 20. The hand-moldable sheet 20 has shape-retention characteristics to retain the moldable funnel 200 in the specific shape into which it is molded. In this embodiment, the hand-moldable sheet 20 is made of aluminum which has better re-conversing ability; however, the hand-moldable sheet 20 may be made of lead or other suitable materials as long as the materials have shape-retention characteristics.

Figure 4:
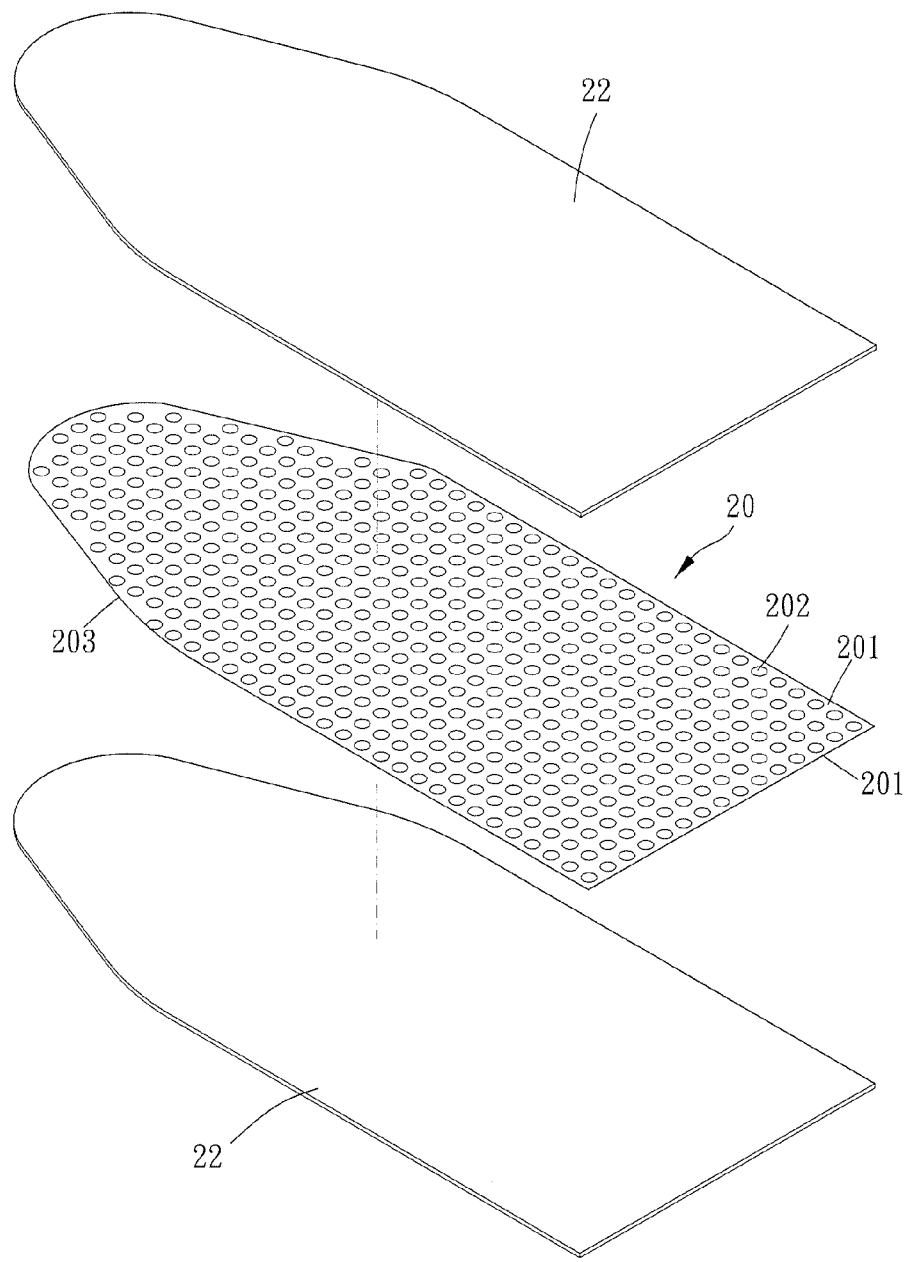
FIG. 4 is a perspective breakdown drawing of the moldable funnel according to the first embodiment of the present invention.
Figure 5:
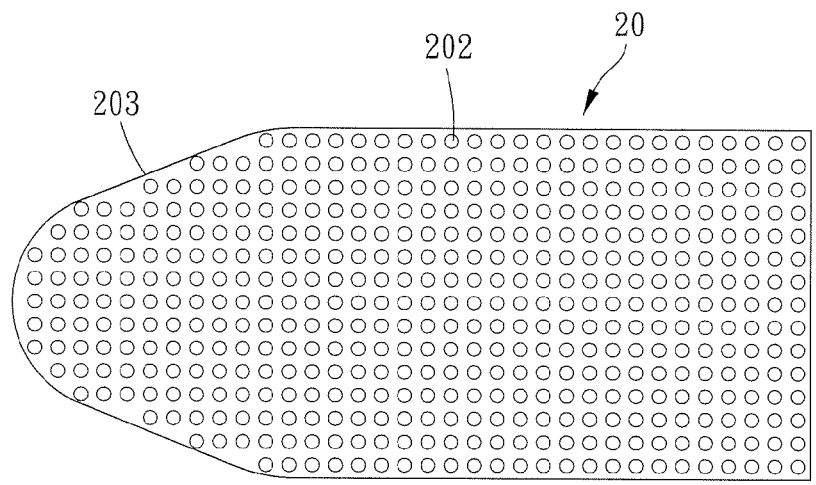
FIG. 5 is a drawing showing a hand-moldable sheet according to a first embodiment of the present invention.

The hand-moldable sheet 20 may be manufactured by being cut not through any through hole 202, such that the perimeter edge 203 of the hand-moldable sheet 20 is substantially smooth (as shown in FIGS. 4 and 5). More specifically, the hand-moldable sheet 20 is manufactured by being cut along the intermediate between each two adjacent through holes 202 according a required specific shape.

Figure 6:
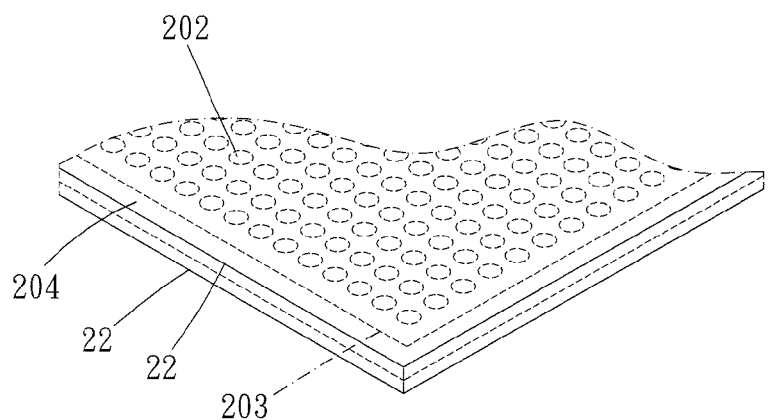
FIG. 6 is a partial perspective drawing of the moldable funnel according to the first embodiment of the present invention.
Figure 7:
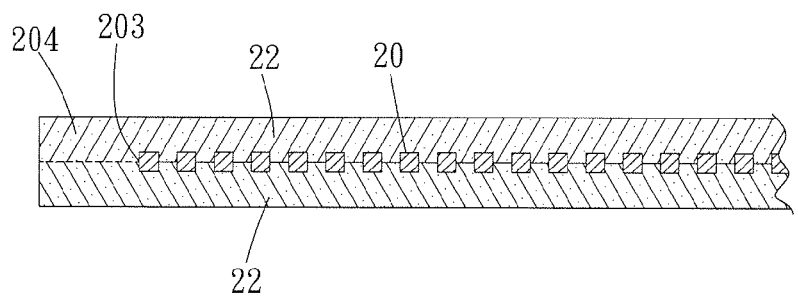
FIG. 7 is a partial cross-sectional view of the moldable funnel according to the first embodiment of the present invention.

The two covering layers 22 at least cover the two corresponding surfaces 201 of the hand-moldable sheet 20 respectively and are connected to each other via at least parts of the through holes 202. The two covering layers 22 are connected via at least parts of the through holes 202, and thus enhancing the combination strength of the two covering layers 22. More specifically, in this embodiment, the two covering layers 22 cover the two corresponding surfaces 201 of the hand-moldable sheet 20 respectively, are connected to each other via all of the through holes 202, and are further connected together beyond the perimeter edge 203 of the hand-moldable sheet 20. That is, the hand-moldable sheet 20 is entirely covered by the two covering layers 22. Parts of the covering layers 22 beyond the perimeter edge 203 of the hand-moldable sheet 20 are connected together to form a lid 204 which extends outwardly from the perimeter edge 203 of the hand-moldable sheet 20 (as shown in FIGS. 6 and 7). Preferably, the extent of the lid 204 extending outwardly from the perimeter edge 203 is greater than the diameter of the through hole 202, and more preferably greater than three times of the diameter of the through hole 202. In fact, the extent of the lid 204 may be varied according to various requirements, so as to enhance the combination of the two covering layers 22 and prevent the separation of the two covering layers 22. The two covering layers 22 may be made of rubber such as, but not limited to, neoprene rubber, butyl rubber, acrylonitrile butadiene rubber (nitril rubber). Preferably, the two covering layers 22 are made of a material which is pliable but strong, scrape-proof, abrasion-proof, light-weight and stretchable, such that the hand-moldable sheet 20 can be well protected, and the hand-moldable sheet 20 and the covering layers 22 can be connected together tightly and homogeneously molded.

The combination of the hand-moldable sheet 20 and the two covering layers 22 may be carried out preferably via hot pressing, so that the two covering layers 22 are slightly melted to be able to flow through the through holes 202 and integrated together, and parts of the two covering layers 22 are further integrated together beyond the perimeter edge 203 of the hand-moldable sheet 20. After the hot pressing is completed, the parts of the two covering layers 22 integrated in the through holes 202 and beyond the perimeter edge 203 are cooled and solidified to form an integral structure, that is, the two covering layers 22 are integrated in an integral structure and completely cover the hand-moldable sheet 20.

Figure 8:
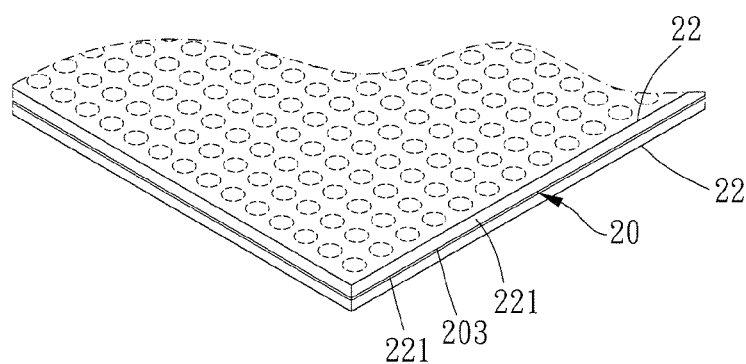
FIG. 8 is a partial perspective drawing of a moldable funnel according to another embodiment of the present invention.
Figure 9:
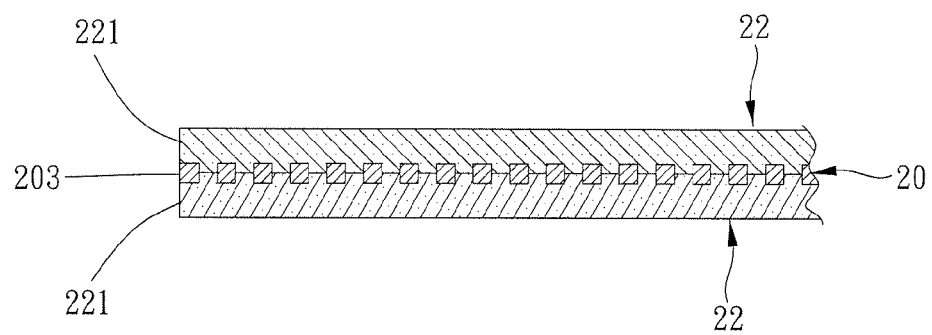
FIG. 9 is a partial cross-sectional view of the moldable funnel according to another embodiment of the present invention.

Additionally, in other embodiment, the two covering layers 22 may be adhered to the two corresponding surfaces 201 of the hand-moldable sheet 20 respectively via an adhering material such as adhering gel (not shown) (i.e., the two covering layers 22 may not be connected to each other via the through holes 202). Parts of the two covering layers 22 may be selectively integrated together beyond the perimeter edge 203 of the hand-moldable sheet 20, namely, the two covering layers 22 do not entirely integrated together. Alternatively, each of the two covering layers 22 may be dimensioned in a size that is substantially equal to that of the hand-moldable sheet 20, and the two covering layers 22 may be disposed respectively on the two corresponding surfaces 201 of the hand-moldable sheet 20 via hot pressing or adhering, such that perimeter edges 221 of the two covering layers 22 are substantially aligned with the perimeter edge 203 of the hand-moldable sheet 20 (as shown in FIGS. 8 and 9).

Figures 10, 11:
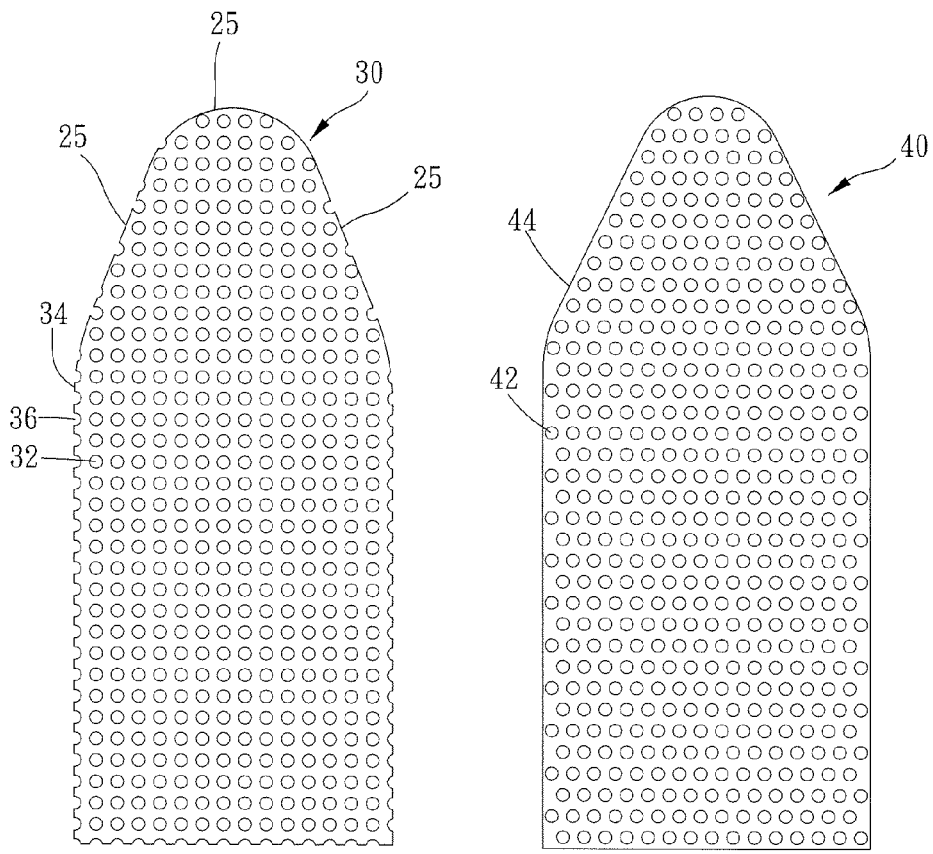
FIG. 10 is a drawing showing a hand-moldable sheet according to another embodiment of the present invention.
FIG. 11 is a drawing showing a hand-moldable sheet according to a second embodiment of the present invention.

As shown in FIG. 10, in another embodiment, a hand-moldable sheet 30 including a plurality of through holes 32 is provided, in which the through holes 32 are substantially arranged in array. A perimeter edge 34 of the hand-moldable sheet 30 is formed with a plurality of openings 36 that open outwardly. The openings 36 may be formed by cutting the hand-moldable sheet 30 through parts of the through holes 32. More specifically, the hand-moldable sheet 30 is formed with the openings 36 with a substantially fixed spacing, by cutting the hand-moldable sheet 30 through parts of the through holes 32 near the perimeter edge 34. Melted portions of the two covering layers are allowed to go through the openings 36 and then be cooled and connected together, thus further enhancing the combination strength of the perimeter edges of the two covering layers and the perimeter edge 34 of the hand-moldable sheet 30. The effect of enhancing combination strength can also be achieved in such a manner that the two covering layers and the hand-moldable sheet 30 are combined via hot pressing or adhering, the hand-moldable sheet 30 is entirely covered, or the perimeter edges of the two covering layers are aligned with the perimeter edge 34 of the hand-moldable sheet 30.

Figure 12:
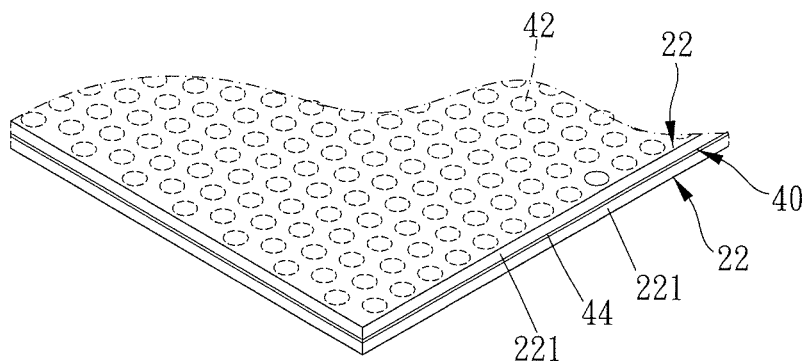
FIG. 12 is a partial perspective drawing of a moldable funnel according to the second embodiment of the present invention.
Figure 13:
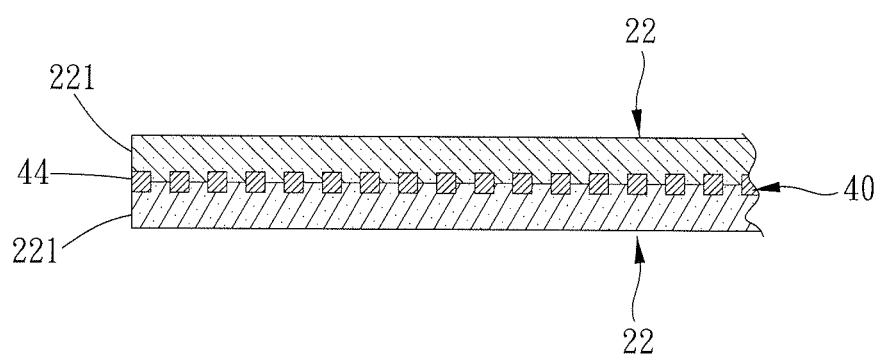
FIG. 13 is a partial cross-sectional view of the moldable funnel according to the second embodiment of the present invention.

As shown in FIGS. 11 to 13, a second embodiment of moldable funnel 40 according to the invention is provided. In this embodiment, a plurality of through holes 42 of the hand-moldable sheet 40 are substantially alternatively disposed in line and row and penetrate through the hand-moldable sheet 40. The hand-moldable sheet 40 is formed without any through hole 42 being cut through, and formed with a substantially smooth perimeter edge 44 with out any opening. More specifically, the hand-moldable sheet 40 is manufactured by being cut along the intermediate between each two adjacent through holes 42 according a required specific shape. Similarly, the hand-moldable sheet 40 may be entirely covered by the two covering layers 22. Alternatively, the perimeter edge 44 of the hand-moldable sheet 40 may be not covered by the two covering layers 22, and the perimeter edges 221 of the two covering layers 22 are substantially aligned with the perimeter edge 44 of the hand-moldable sheet 40 (as shown in FIGS. 12 and 13). In addition, the two covering layers 22 may be disposed on the two corresponding surfaces of the hand-moldable sheet 40 respectively via hot pressing or adhering, and the two covering layers 22 may be adhered only to the two corresponding surfaces of the hand-moldable sheet 40 and not be combined together via the through holes 42. Since the through holes 42 are substantially alternatively disposed in line and row in the hand-moldable sheet 40, the two covering layers 22 may be connected together without continuous-unconnected portions in the same line and the same row, thus further enhancing the combination strength of the two covering layers 22. It is noted that parts of the covering layers 22 beyond the perimeter edge 44 of the hand-moldable sheet 40 may be connected together to form a lid which extends outwardly from the perimeter edge 44 of the hand-moldable sheet 40.

Figure 14:
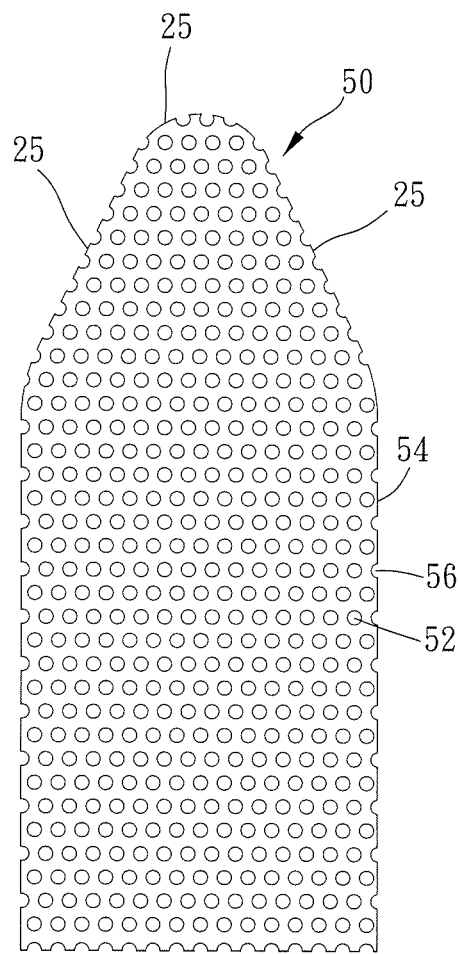
FIG. 14 is a drawing showing another hand-moldable sheet according to the second embodiment of the present invention.

As shown in FIG. 14, a hand-moldable sheet 50 including a plurality of through holes 52 is provided. A perimeter edge 54 of the hand-moldable sheet 50 is formed with a plurality of openings 56 that open outwardly. The openings 56 may be formed by cutting the hand-moldable sheet 50 through parts of the through holes 52. The arrangement of the openings 56 at the perimeter edge 54 of the hand-moldable sheet 50 can help to enhance the combination strength of the perimeter edges of the two covering layers and the perimeter edge 54 of the hand-moldable sheet 50. Alternatively, parts of the covering layers beyond the perimeter edge 54 of the hand-moldable sheet 50 may be connected together to form a lid which extends outwardly from the perimeter edge 54 of the hand-moldable sheet 50.

Figure 11A:
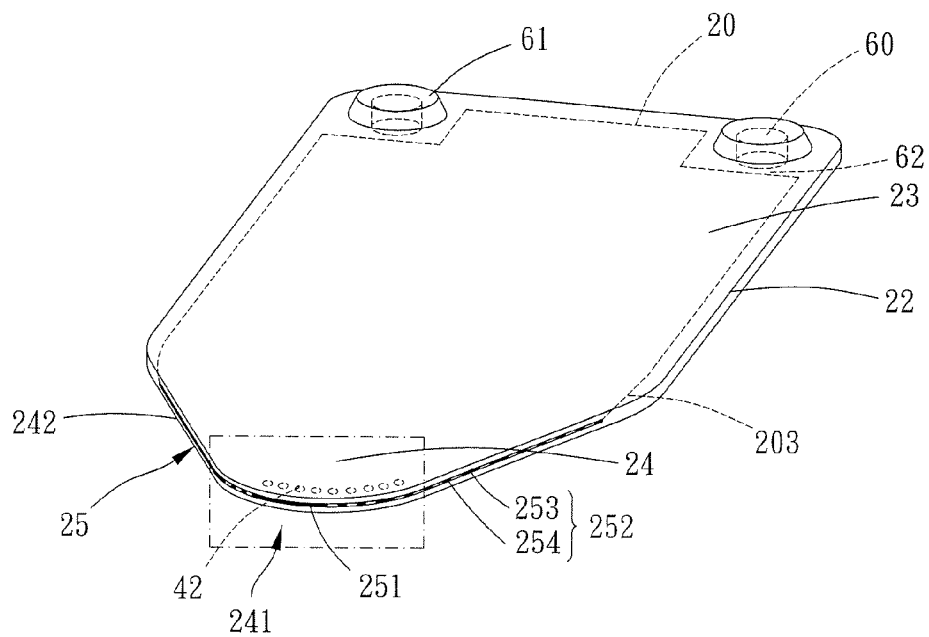
FIGS. 11A to 11C are drawings showing a moldable funnel according to an alternative embodiment of the present invention.
Figure 11C:
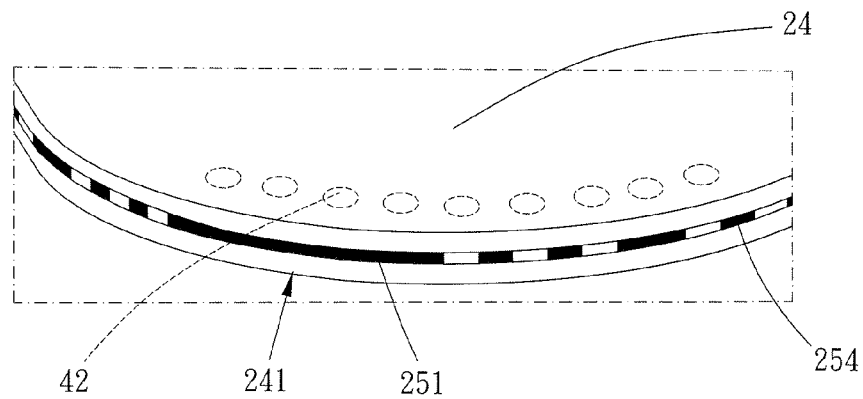
Figure 11B:
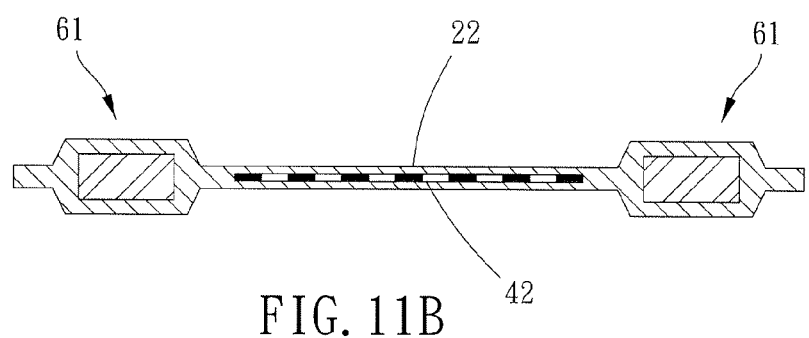

As shown in FIGS. 11A to 11C, the moldable funnel may include a main body 23 and a tapered end 24 tapering from a side of the main body 23, and the tapered end 24 having a tip portion 241 archedly convex away from the main body 23. Preferably, the hand-moldable sheet 20 is non-exposed at the main body 23, and the hand-moldable sheet 20 includes a plurality of exposed perimeter sections 25 arranged and spaced apart in intervals (partially exposed) along part of the perimeter edge 203 of the tapered end 24. For example, the exposed perimeter sections 25 include a long exposed perimeter section 251 and a plurality of short exposed perimeter sections 252. The long exposed perimeter section 251 is disposed at the tip portion 241 of the tapered end 24 and has an extent greater than four times of a diameter of the through hole 42. The short exposed perimeter sections 252 are disposed by two sides of the long exposed perimeter section 251. Each of the short exposed perimeter sections 252 has an extent less than three times of the diameter of the through hole 42 perimeter.

The short exposed perimeter sections 252 include a plurality of first short exposed perimeter sections 253 and a plurality of second short exposed perimeter sections 254. Each of the first short exposed perimeter sections 253 has an extent greater than one time of the diameter of the through hole 42, and each of the second short exposed perimeter sections 254 has an extent less than one time of the diameter of the through hole 42. At least one of the second short exposed perimeter sections 254 is disposed between one of the first short exposed perimeter sections 253 and the long exposed perimeter section 251, and at least one of the second short exposed perimeter sections 254 is disposed between two said first short exposed perimeter sections 253 adjacent to each other.

In this embodiment, the tapered end 24 further has two straight side portions 242 linearly connected respectively between the main body 23 and the tip portion 241. It is noted that the long exposed perimeter section may be continuously disposed from one end of one of the two straight side portions 242, through the tip portion, to one end of the other of the two straight side portions 242, and part of the through hole 42 is opened thereon.

Through the above structure, the two straight side portions 242 can be easy to be shaped since the two straight side portions 242 are provided with relatively shorter exposed perimeter sections, and the molded shape of the tip portion 241 can be shaped into a very small size and can be well retained in a specific shape into which it is molded since the tip portion 241 is provided with relatively longer exposed perimeter sections.

Preferably, at least one magnetic member 60 is provided on the main body 23. In this embodiment, two said magnetic members 60 are provided on the main body 23 at two corners of the moldable funnel. The magnetic member 60 is protrusive beyond the two corresponding surfaces of the hand-moldable sheet 20. The magnetic member 60 is entirely encompassed by the two covering layers 22 to form two bumps 61 on two corresponding sides of the moldable funnel. Each bump 61 is shaped as a part of a cone in this embodiment. Preferably, a gap 62 is provided between the hand-moldable sheet 20 and the magnetic member 60, and the two covering layers 22 are further connected to each other via the gap 62. Through the at least one magnetic member 60, the moldable funnel can be attached to an object such as a metal plate without any help of hand gripping as it is used during filling of fluid or storing.

For various requirements, each of the exposed perimeter sections 25 may have an extent at least two times greater than a diameter of the through hole 202 (as shown in FIG. 10); or each of the through holes 202 is unopened at the perimeter edge of the hand-moldable sheet (as shown in FIG. 11), and the part of the hand-moldable sheet 20 is entirely exposed along the part of the perimeter edge 203 of the tapered end 24.

Figure 15:
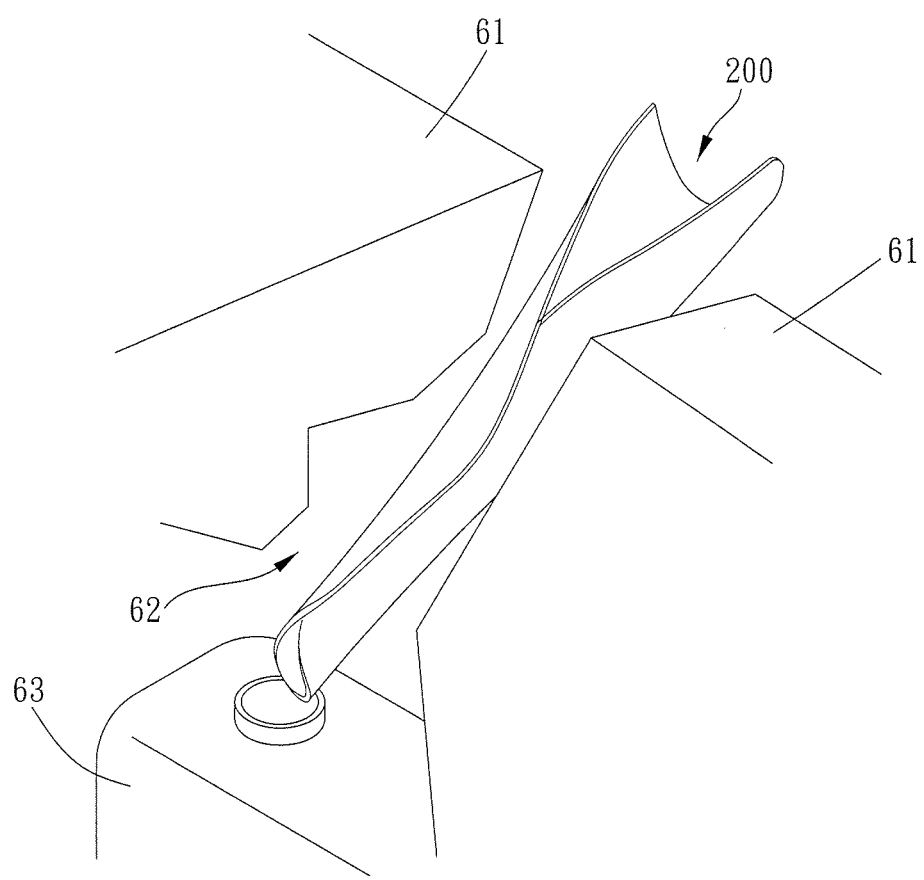
FIG. 15 is a drawing showing a moldable funnel being applied to a space according to the present invention.

As shown in FIG. 15, the moldable funnel 200 is adapted to use in a narrow or crooked space 62 which is constructed of parts. The moldable funnel 200 is manually molded into and retained in a specific shape suitable for the narrow or crooked space 61, so as to carry out a task of adding water into a radiator 63 of automobile or adding oil or the like into a container.

Given the above, since the hand-moldable sheet has shape-retention characteristics and the materials of the two covering layers are pliable, strong and stretchable, the moldable funnel can be retained in a specific shape such as tubular shape or the like after molded. The tubular moldable funnel can further be bent according to various requirements, so that it can favorably and smoothly pass through the narrow or crooked space. Hence, when an user carries out a liquid-adding task in a specific, narrow or crooked space (for example, adding of engine oil, adding of transmission fluid, adding of water into a radiator, or adding of water into a container of windshield washer device), the moldable funnel can be manually molded into and retained in the specific shape suitable for the specific, narrow or crooked space, so as to facilitate the liquid-adding task.

Furthermore, the two covering layer may be combined together via the through holes and combined together beyond the perimeter edge of the hand-moldable sheet, thus enhancing the combination strength of the two covering layers.

Generally speaking, since the specific, narrow or crooked space is usually constructed of a plurality of parts of an apparatus or device, and the parts are usually hard and sharp, it can possibly cause damage to a hand of user. However, by using the moldable funnel of the invention, the user can carry out the liquid-adding task without hands reaching into the specific space, thus preventing the user from being injured and enhancing the safety of use. Also, since the two covering layers are made of materials that are pliable but strong, scrape-proof, abrasion-proof and stretchable, it can prevent the moldable funnel from being scraped or damaged when the moldable funnel is put into the specific space, and the lifetime is thereof increased.

Additionally, the hand-moldable sheet and the covering layers are made of light-weight materials, and the total weight of the moldable funnel can be therefore lowered.

Besides, after a liquid-adding task is completed, the moldable funnel can be selectively flatted or rolled up, so as to facilitate storage and save space.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A moldable funnel, including:
a hand-moldable sheet, including two corresponding surfaces and a plurality of through holes, the through holes being evenly arranged in the hand-moldable sheet, at least parts of the through holes being unopened at a perimeter edge of the hand-moldable sheet, and the hand-moldable sheet having shape-retention characteristics to retain the moldable funnel in a specific shape into which it is molded; and
two covering layers, at least covering the two corresponding surfaces of the hand-moldable sheet respectively and being connected to each other via at least parts of the through holes;
wherein the moldable funnel includes a main body and a tapered end tapering from a side of the main body, the tapered end having a tip portion archedly convex away from the main body;
wherein the two covering layers are made of rubber;
wherein the covering layers are partially connected together beyond the perimeter edge of the hand-moldable sheet;
wherein the hand-moldable sheet is non-exposed at the main body, and the hand-moldable sheet includes a plurality of exposed perimeter sections arranged between non-exposed perimeter sections and spaced apart in intervals along part of the perimeter edge of the tapered end, the exposed perimeter sections include a long exposed perimeter section and a plurality of short exposed perimeter sections, the long exposed perimeter section is disposed at the tip portion of the tapered end and has an extent greater than four times of a diameter of the through hole, the short exposed perimeter sections are disposed by two sides of the long exposed perimeter section, each of the short exposed perimeter sections has an extent less than three times of the diameter of the through hole.

2. The moldable funnel of claim 1, wherein the through holes are substantially disposed in array and penetrate through the hand-moldable sheet.

3. The moldable funnel of claim 1, wherein the through holes are substantially alternatively disposed in line and row and penetrate through the hand-moldable sheet.

4. The moldable funnel of claim 1, wherein the hand-moldable sheet is made of aluminum.

5. The moldable funnel of claim 1, wherein the covering layers is adhered to the two corresponding surfaces of the hand-moldable sheet.

6. The moldable funnel of claim 1, wherein the short exposed perimeter sections include a plurality of first short exposed perimeter sections and a plurality of second short exposed perimeter sections, each of the first short exposed perimeter sections has an extent greater than one time of the diameter of the through hole, and each of the second short exposed perimeter sections has an extent less than one time of the diameter of the through hole.

7. The moldable funnel of claim 6, wherein at least one of the second short exposed perimeter sections is disposed between one of the first short exposed perimeter sections and the long exposed perimeter section, and at least one of the second short exposed perimeter sections is disposed between two said first short exposed perimeter sections adjacent to each other.

8. The moldable funnel of claim 1, wherein the tapered end further has two straight side portions linearly connected respectively between the main body and the tip portion.

9. The moldable funnel of claim 8, wherein the short exposed perimeter sections include a plurality of first short exposed perimeter sections and a plurality of second short exposed perimeter sections, each of the first short exposed perimeter sections has an extent greater than one time of the diameter of the through hole, and each of the first short exposed perimeter sections has an extent less than one time of the diameter of the through hole.

10. The moldable funnel of claim 9, wherein at least one of the second short exposed perimeter sections is disposed between one of the first short exposed perimeter sections and the long exposed perimeter section, and at least one of the second short exposed perimeter sections is disposed between two said first short exposed perimeter sections adjacent to each other.

11. The moldable funnel of claim 1, wherein at least one magnetic member is provided on the main body.

12. The moldable funnel of claim 11, wherein the magnetic member is protrusive beyond the two corresponding surfaces of the hand-moldable sheet.

13. The moldable funnel of claim 11, wherein the magnetic member is entirely encompassed by the two covering layers to form two bumps on two corresponding sides of the moldable funnel.

14. The moldable funnel of claim 13, wherein the bump is shaped as a part of a cone.

15. The moldable funnel of claim 11, wherein a gap is provided between the hand-moldable sheet and the at least one magnetic member, and the two covering layers are further connected to each other via the gap.

* * * * *